(12) United States Patent
Erskine

(10) Patent No.: US 6,243,101 B1
(45) Date of Patent: Jun. 5, 2001

(54) METHOD OF ENHANCING COMPUTER-GENERATED SYMBOLS

(76) Inventor: Timothy Joseph Erskine, 1160 East Stone Valley Way, Sandy, UT (US) 84094

( * ) Notice: Subject to any disclaimer, the term of this patent is extended or adjusted under 35 U.S.C. 154(b) by 0 days.

(21) Appl. No.: 09/146,712

(22) Filed: Sep. 3, 1998

(51) Int. Cl.[7] .................................................. G06T 11/00
(52) U.S. Cl. ..................... 345/433; 345/326; 345/437; 345/964
(58) Field of Search ................................. 345/326, 433, 345/347, 334, 437, 420, 419, 329, 435, 441, 964; 382/113

(56) References Cited

U.S. PATENT DOCUMENTS

| | | |
|---|---|---|
| 4,875,865 | 10/1989 | Kato et al. . |
| 4,933,865 | 6/1990 | Yamamoto et al. . |
| 5,297,254 | 3/1994 | Arai et al. . |
| 5,408,601 | 4/1995 | Nakamura et al. ................... 345/347 |
| 5,572,639 | 11/1996 | Gantt ..................................... 345/433 |
| 5,634,093 | 5/1997 | Ashida . |
| 5,640,499 | 6/1997 | Nagai . |
| 5,664,083 | 9/1997 | Takeuchi et al. . |
| 5,754,842 | 5/1998 | Minagawa . |
| 5,764,936 | 6/1998 | Evans et al. .......................... 345/326 |
| 5,793,377 | 11/1998 | Moore . |
| 5,943,062 | 8/1999 | Schanel . |
| 5,977,988 | 11/1999 | Greene . |
| 8,465,324 | 11/1995 | Lee et al. . |

Primary Examiner—Matthew Luu
Assistant Examiner—Thu-Thao Havan
(74) Attorney, Agent, or Firm—Michael Schwarz

(57) ABSTRACT

In a computer aided design system, a method for converting a computer-generated symbol, or computer generated graphical entities, into an intelligent symbol involves identifying connection points to the computer-generated symbol and generating coordinates for the connection points. A symbol definition is built using the coordinates. The connection points are found by determining a perimeter substantially including the symbol and identifying graphical entities on or near the perimeter. Connectors joined to the symbol are also converted into intelligent connectors by finding coordinates for points on the connectors. A multi-symbol is generated from two or more symbols. The definition of one of the symbols forming the multi-symbol is maintained and linked to the multi-symbol such that changes in that symbol are reflected in the multi-symbol.

13 Claims, 10 Drawing Sheets

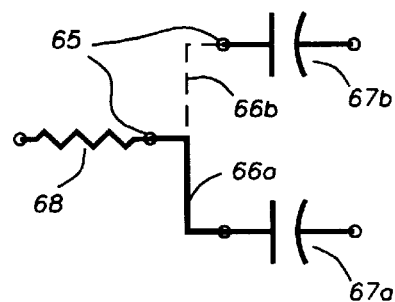
FIG. 6C
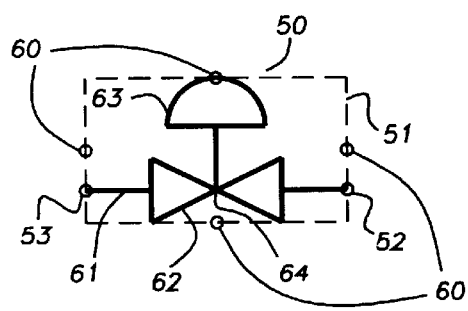
FIG. 6B
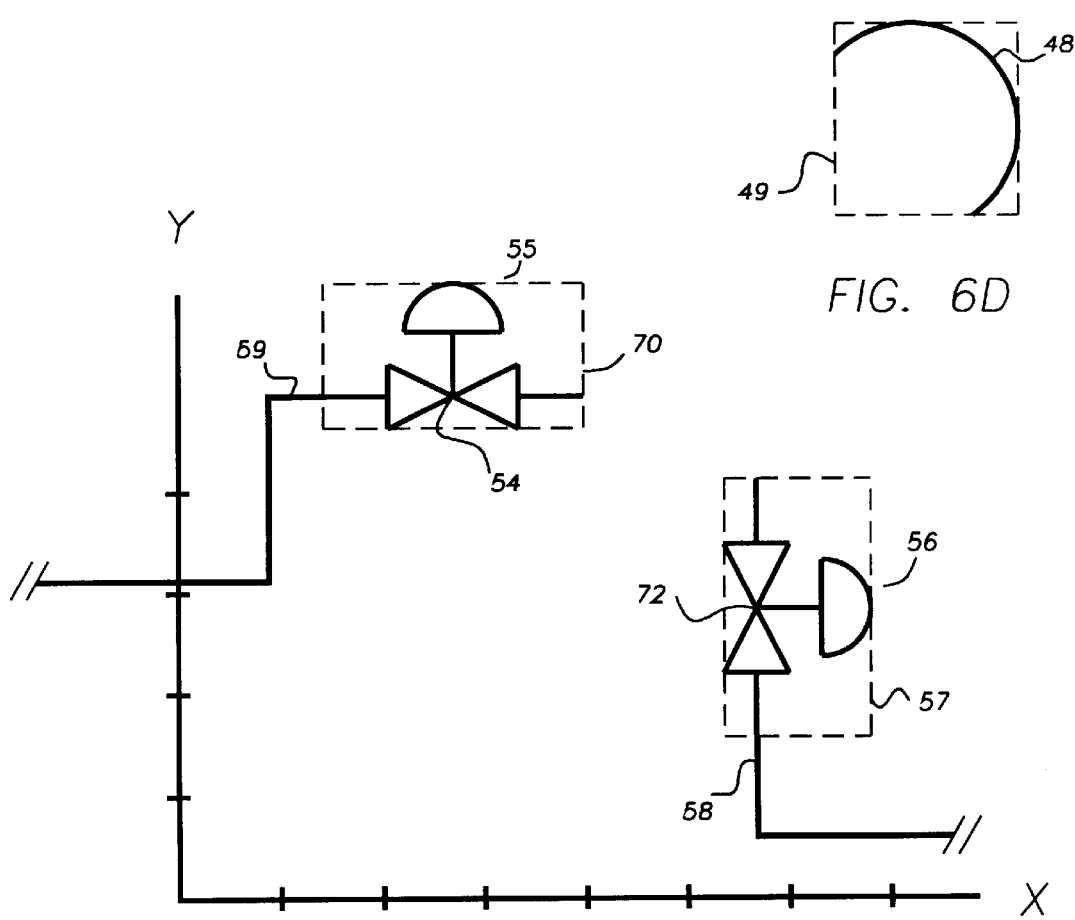
FIG. 6D
FIG. 6A

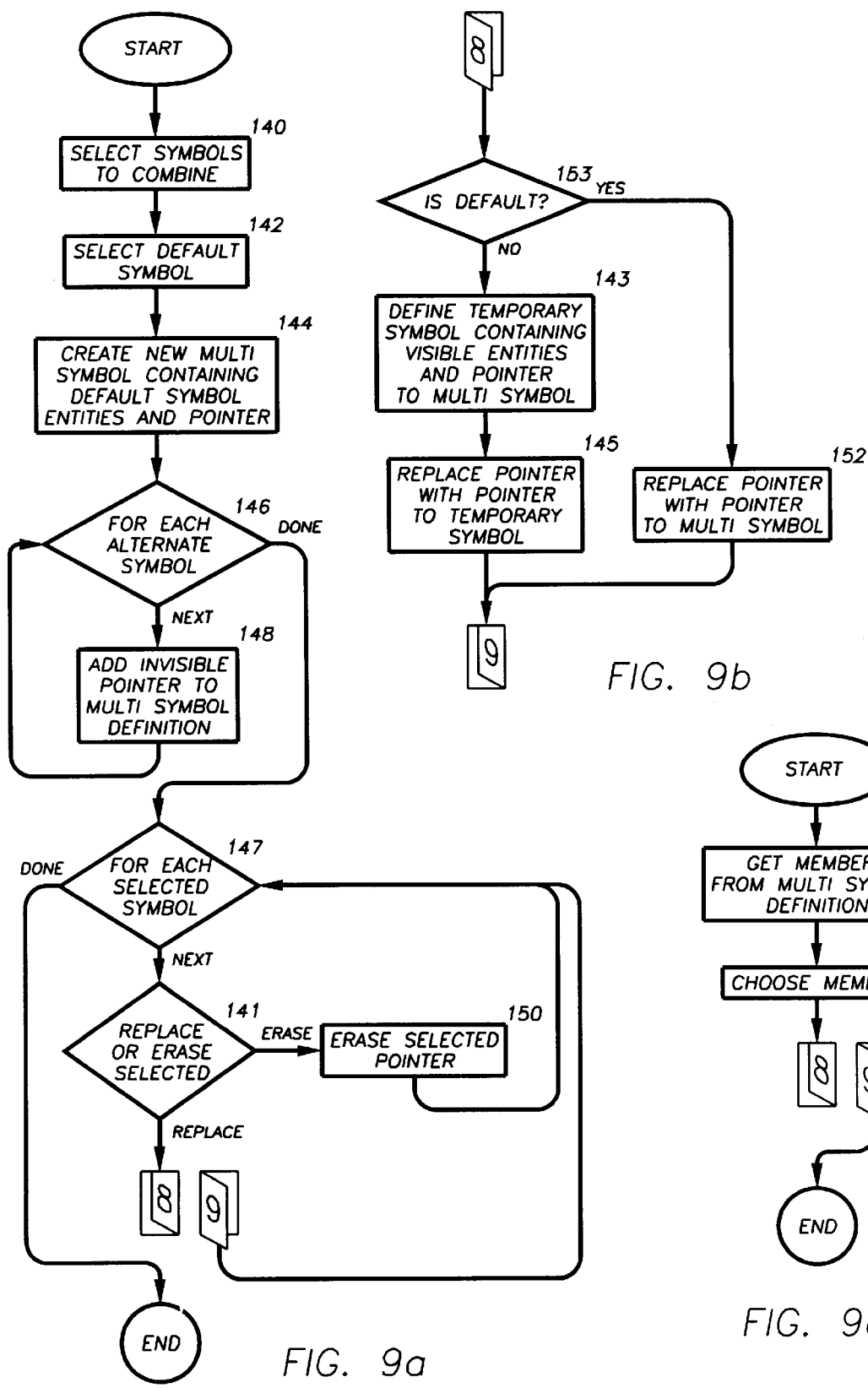

METHOD OF ENHANCING COMPUTER-GENERATED SYMBOLS

BACKGROUND

This invention relates generally to the field of software for Computer Aided Design, or "CAD." More specifically, it relates to software for use in a CAD system for creating two-dimensional diagrams, including but not limited to flow charts, electrical schematics, plant processes and the like.

In CAD systems, diagrams most often consist of representational graphical objects or symbols interconnected by straight, curved or serpentine lines, chains of lines, or other shapes such as arrows which illustrate the connectivity between symbols. Examples of such diagrams are electronic circuit diagrams or computer flow charts. Some kinds of diagrams, such as architectural space plans, do not require connecting lines. The symbols are made up of individual graphical entities, such as lines, circles, arcs, text and images. Different software companies may refer to symbols using terminology such as "blocks" or "shapes." Symbols often exist on a diagram as collections of these individual entities but are difficult to edit in this state.

Once the individual graphical entities have been combined to form a symbol, the CAD system software represents the symbol on the diagram by means of a "pointer." When we refer to a symbol visible on a diagram, we are actually referring to the pointer to the symbol. The pointer allows the symbol to be manipulated as a single entity, which makes diagram editing much easier for the operator. The pointer to the symbol appears to the operator like the original entities which make up the symbol and can be used any number of times on a diagram. Any changes to the symbol design are reflected in all pointers to the symbol. Symbol pointers can be transformed by scaling, rotation, stretching, mirroring etc., and will appear that way on the screen.

Using traditional CAD software such as "AutoCAD" available from Autodesk, Inc., the operator creates a diagram either by placing an existing symbol on the diagram from a collection or library of such symbols, or by creating the individual entities which depict a new symbol. Interconnecting lines, or connections, are then manually drawn from a point on or near the new symbol to appropriate destinations. Every point along the path of the connection must be specified by the operator. This is a very tedious process, and must be repeated every time the position, rotational orientation, size or other parameter of any symbol is changed. Symbols used in this type of system can aptly be referred to as "dumb symbols."

Software is widely available which automates the manipulation and interconnection of symbols, so that when an operator changes the position or other parameter of a symbol, all connections associated with that symbol reconfigure themselves to maintain that association. Such software is available from Visio Corp. under the name "Visio Technical" Complex connections can be created between symbols by simply picking start and end points. Symbols and connections which provide this automatic behavior are referred to as "intelligent," or "smart" symbols and connections.

Before the advent of software which provides intelligent or smart symbols and connections, a large number of diagrams were created containing "dumb" symbols, that is by manually drawing the connections as previously described, and often by manually creating the symbols as well. Users of such software typically have libraries of dumb symbols. There is therefore a need to provide a method for transforming these dumb symbols into intelligent symbols. It is an object of the invention to provide such a method.

It is also an object of the invention to provide a method of converting computer-generated graphical entities into intelligent symbols.

It is often useful in a CAD system to have symbols which can be changed by the operator to appear as one or more different symbols, often related, such as a collection of valves, chairs, fasteners, etc. These are referred to as "multi-symbols." It is a further object of the invention to provide a method of creating multi-symbols from preexisting symbols.

SUMMARY OF THE INVENTION

The present invention is a method of converting a computer-generated symbol comprising one or more graphical entities into an intelligent symbol. The method comprises the steps of identifying one or more connection points, the one or more connection points having variable positions. The connection points are associated with the graphical entities forming the computer-generated symbol. Coordinates are generated for the connection points. The coordinates describe the connection points in relation to a reference point. A symbol definition comprising the coordinates for the connection points is built for the computer-generated symbol.

A further aspect of the invention involves the identification of the connection points by the steps of determining a perimeter substantially including the computer-generated symbol and identifying the graphical entities on or near the perimeter. If the identified graphical entities are on or near the perimeter define a connection point, then the step of generating coordinates for the connection point comprises the step of generating coordinates for the identified graphical entities.

A further aspect of the invention is the determination of coordinates for a connector joined to the computer-generated symbol and using those coordinates to generate an intelligent definition of the connector.

Another aspect of the invention is a method of converting one or more computer-generated graphical entities into an intelligent symbol. The method comprises the steps of combining the computer-generated graphical entities such that the computer-generated graphical entities form a symbol, determining a geometrical origin for the symbol and identifying the computer-generated graphical entities that form connection points on the symbol. Coordinates for the connection points are generated such that the coordinates describe the connection points in relation to a reference point. An intelligent definition for the symbol is built, comprising the definitions of the computer-generated graphical entities, the geometrical origin for the symbol and the coordinates for the connection points. A further aspect of the invention involves finding a geometrical origin for the symbol by determining a centroidal location of an area substantially including the symbol.

Still another aspect of the invention is a method of creating a multi-symbol from one or more symbols. The method comprises the steps of forming a multi-symbol definition by combining the definition of a first symbol with the definition of a second symbol. The second symbol definition is preserved and inked to the multi-symbol definition such that if changes are made to the second symbol definition, such changes are reflected in the multi-symbol.

BRIEF DESCRIPTION THE DRAWINGS

Figure 7A:
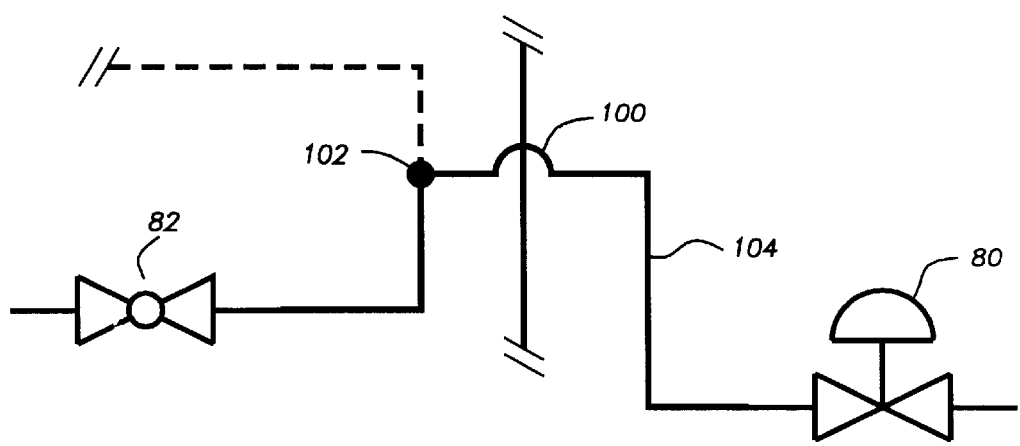
Figure 8C:
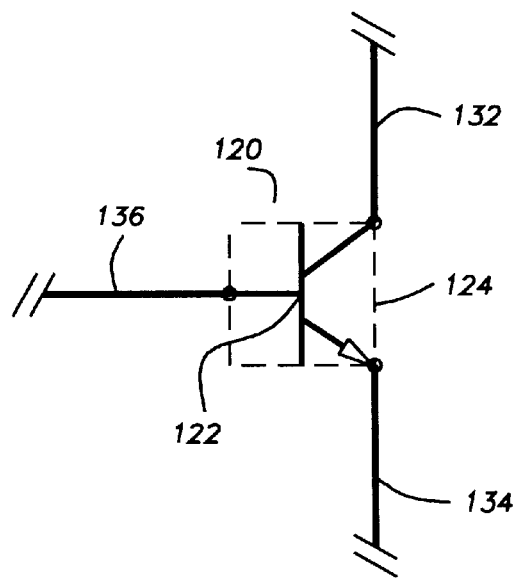
Figure 8A:
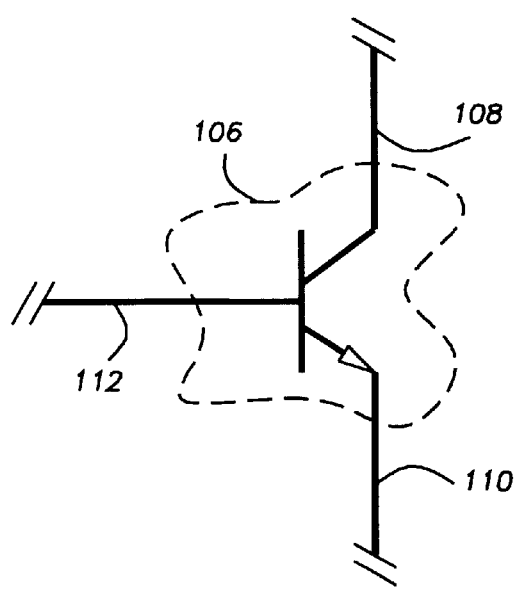
Figure 10A:
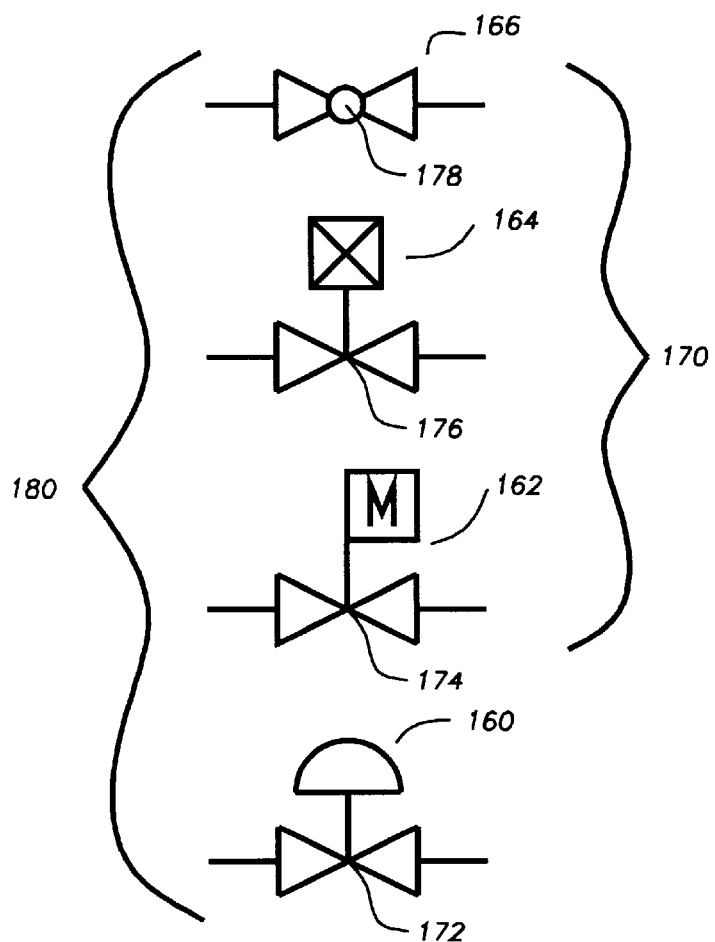

FIGS. 6a, b, c and d illustrate connections and symbol pointers on a diagram and other elements used for symbol and connection conversion;

FIGS. 7a and b illustrate diagram elements used during the creating of intelligent connections;

FIGS. 8a, b and c illustrate diagram elements used when converting entities into intelligent symbols;

FIGS. 9a, b and c are flow charts showing the preferred method for creating a multi symbol from a group of symbols;

FIGS. 10a, b and c are illustrations describing multi symbol creation.

DETAILED DESCRIPTION

The following is a description of the preferred embodiment of the invention. It is intended to be illustrative and not limiting. The full scope of the invention is to determined by reference to the claims and their equivalents.

The following is a list of terms used throughout this specification:

Entity: data defining a graphical object, such as a line, circle, text, etc. Elements 61, 62 and 63 are examples of entities in FIG. 6b.

Symbol: a collection of entities which can be manipulated as a single object. Symbol 50 in FIG. 6b is an example of a symbol which contains entities 61, 62 and 63.

Symbol origin: the reference point from which the symbol entities are measured, typically at 0,0 on an X, Y coordinate system. In FIG. 6b, 64 indicates the origin of symbol 50.

Pointer: the single entity which references a particular symbol and appears on the computer screen as the entities which define the symbol. In FIG. 6a, 55 and 56 are pointers which reference symbol 50.

Pointer origin: the coordinates of the pointer on the diagram. In FIG. 6a, 54 is the pointer origin of pointer 55.

Connector: An object which graphically connects symbols. In FIG. 7a line 104 is a connector.

Intelligent connection: An object which maintains the graphical association between symbols. In FIG. 6c, intelligent connection 66a is shown between intelligent symbols 67a and 68. When intelligent symbol 67a is moved to location 67b, intelligent connection 66a automatically changes routes as shown by dashed line 66b.

Connection point: A point on a symbol at which a connector joins to the symbol so that the symbol can be connected to one or more other symbols. In FIG. 6c, points 65 are connection points.

Plain diagram: a diagram consisting at least partly of diagram elements which are entities and/or symbols but which do not have intelligence.

Intelligent diagram: a diagram consisting at least partly of diagram elements which are intelligent symbols and/or intelligent connections.

Multi symbol: a symbol made up of two or more symbols which can be changed by the operator to appear as one of at least two different collections of entities. In FIGS. 10a and b, multi symbol 168 can be changed by the operator to appear as either 160, 162, 164 or 166.

The preferred embodiment of the invention will now be described with reference to the flow charts of FIGS. 1–5 and 9, it being recognized that this description will enable a person of ordinary skill in the art to implement the invention by means of writing suitable computer code.

Figure 1:
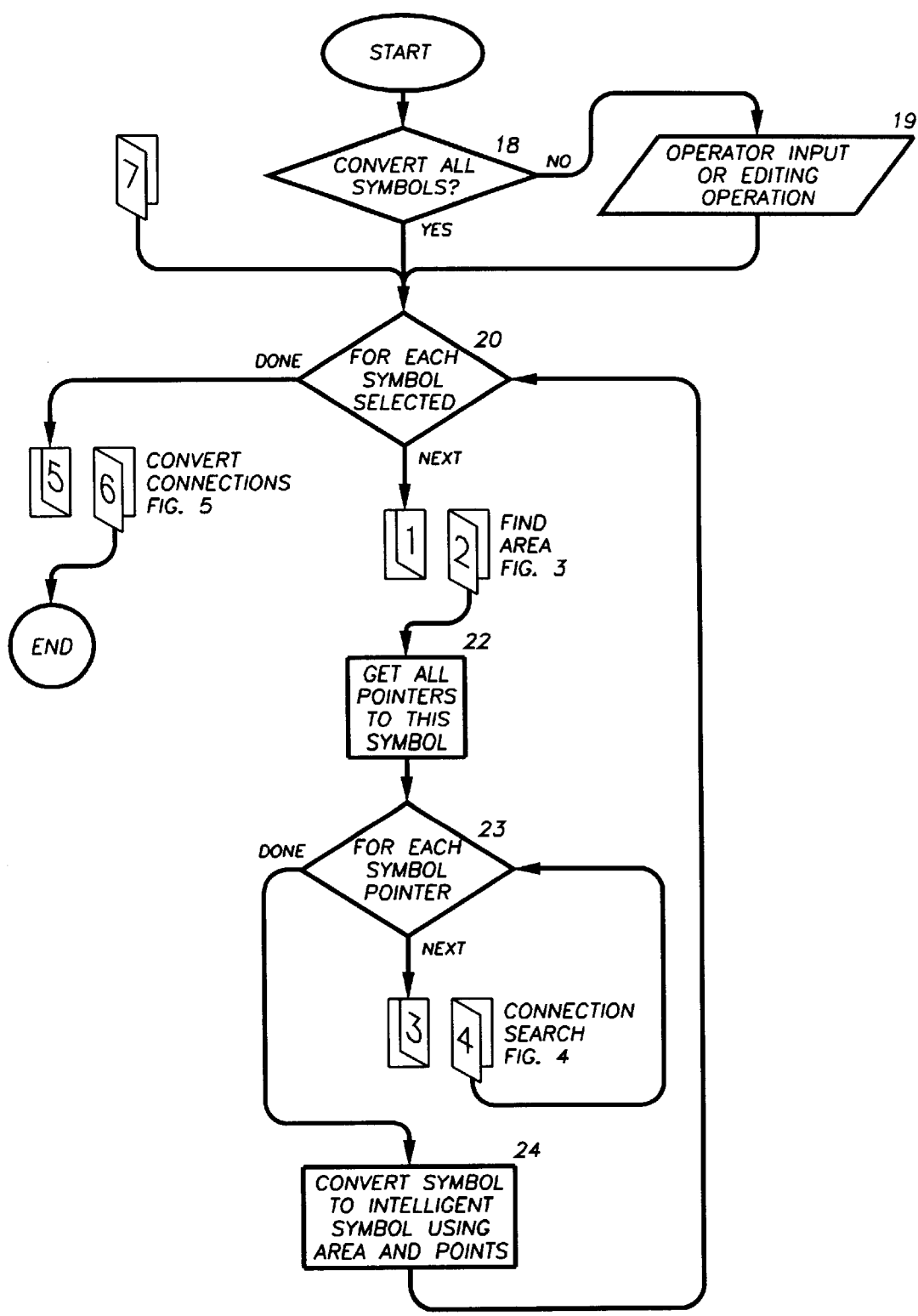
FIG. 1 is a flow chart showing the preferred method for automatically converting symbols into intelligent symbols.

FIG. 1 is a flow chart of a method for automatically converting symbols to intelligent symbols and converting all the connection entities routed to each symbol (represented in the CAD system as a symbol pointer) into intelligent connections.

Figure 3:
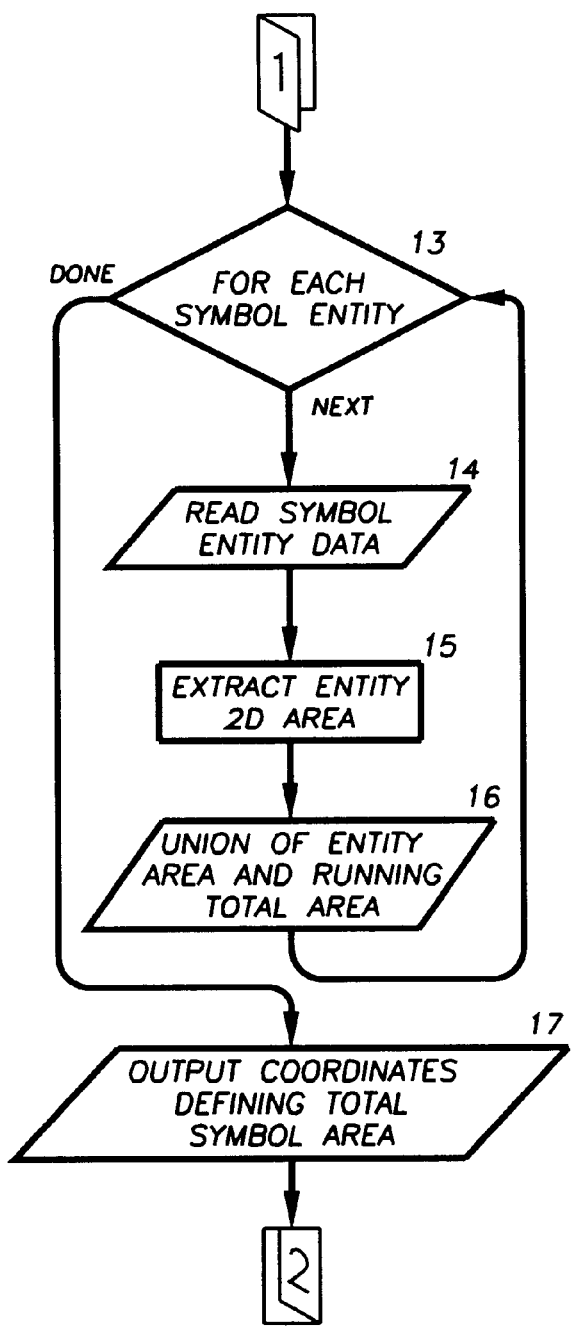
FIG. 3 is a flow chart showing the preferred method used by FIG. 1 and FIG. 2 for determining the area of a symbol.

The dumb symbols to be converted in the plain diagram are specified either in step 18 by selecting all symbols, or in step 19 by operator input or other selection method. The area of each symbol selected in step 18 or 19 (see step 20) is determined using the method shown in FIG. 3. Though this method uses the area of symbols, it is recognized that one skilled in the art could devise other methods using any kind of perimeter substantially including the symbol entities. Referring now to FIG. 3, each symbol 50 (see FIG. 6b) is made up of a number of entities 61, 62, 63, etc. Each such entity is described as data stored in the diagram file. The data of each entity is read at step 14 and used to determine its area. Example entity 48 (see FIG. 6d) is shown together with its calculated area 49. The area 49 is calculated as a rectangle aligned with the X and Y axis of the diagram, but can be any other shape which substantially includes the entity. At step 16 this area is united with the total area of all the other entities which make up the symbol. The total area 51 of symbol 50 (see FIG. 6b) is stored at step 17. Total area 51 is preferably defined as a rectangle aligned with the X and Y axis of the diagram which encloses all the entities (61, 62, 63, etc.) in the symbol 50, but can be any other shape which contains or nearly contains the entities.

In FIG. 1, step 22, all pointers on the diagram which reference the symbol are found. Pointers 55 and 56 (see FIG. 6a) reference symbol 50. For each pointer found (see step 23) a search for connection points is done using the method shown in FIG. 4.

Figure 4:
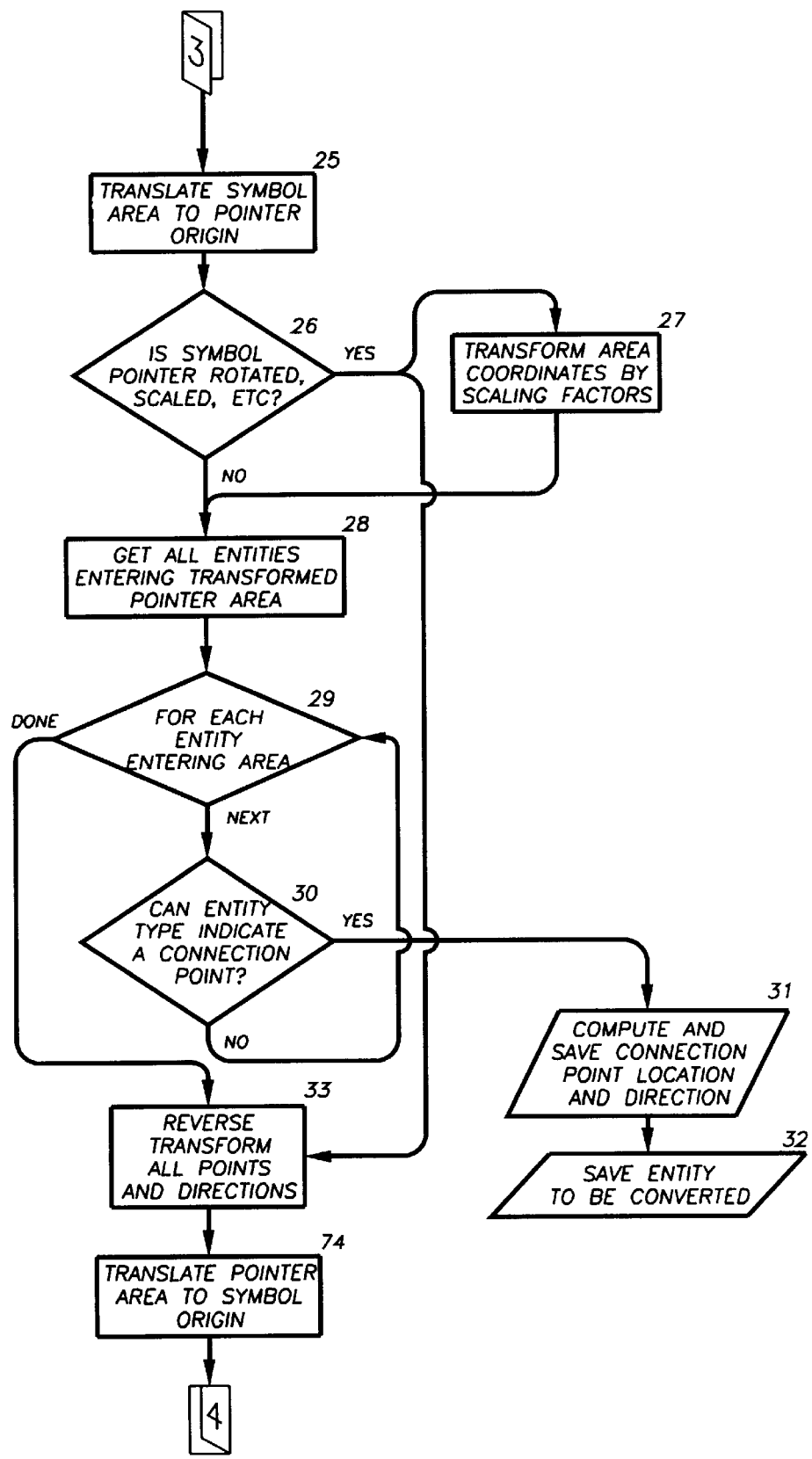
FIG. 4 is a flow chart showing the preferred method used by FIG. 1 and FIG. 2. For determining intelligent symbol connection points.

Referring now to FIG. 4, if the symbol pointer has been transformed (See step 26) the symbol area 51 (see FIG. 6b) is translated from the symbol origin 64 to the pointer origin 72 of pointer 56 (see FIG. 6a). The transformation (rotation, scale, mirroring, etc.) of pointer 56 is determined at step 26, and applied to translated symbol or pointer area 57 at step 27.

The connection points associated with the graphical entities forming a symbol are identified in accordance with the following steps: At step 28, all entities entering pointer area 57 are found. For example, line 58 enters pointer area 57 and is therefore included. For each entity entering or in near proximity to pointer area 57 (see step 29) the type of entity is checked at step 30 to determine if the entity can be used to define a connection point. Lines, poly-lines, arcs and splines are examples of entities which have an end point which can define a connection point. Entities may be part of the symbol definition or other diagram entities. Entity 58 meets the test at step 30, so its coordinates (preferably end point and direction, but rectangular or other coordinates can also be used) are determined at step 31, and entity 58 is saved at step 32 for later conversion to an intelligent connection. At step 33, if the pointer has been transformed (see step 26), all coordinates of connection points calculated at step 31 are reverse transformed by the transformation of pointer 56. At step 74, all points and directions are translated from the pointer origin 72 to the symbol origin 64. Point 52 (see FIG. 6b)is the resultant point determined from line 58 at pointer 56.

In FIG. 1, step 24, the symbol 50 is converted to an intelligent symbol by building an intelligent symbol definition. This is preferably accomplished in the example illustrated by combining its existing definition with the area 51 and the coordinates of connection points 52 and 53, which were found via lines 58 and 59 at pointers 55 and 56 respectively, along with any default connection points, such as points 60. After step 24 has been performed on all symbols selected at step 18 or 19, all the entities saved at step 32 of FIG. 4 are converted to intelligent connections using the method shown in FIG. 5.

Figure 5:
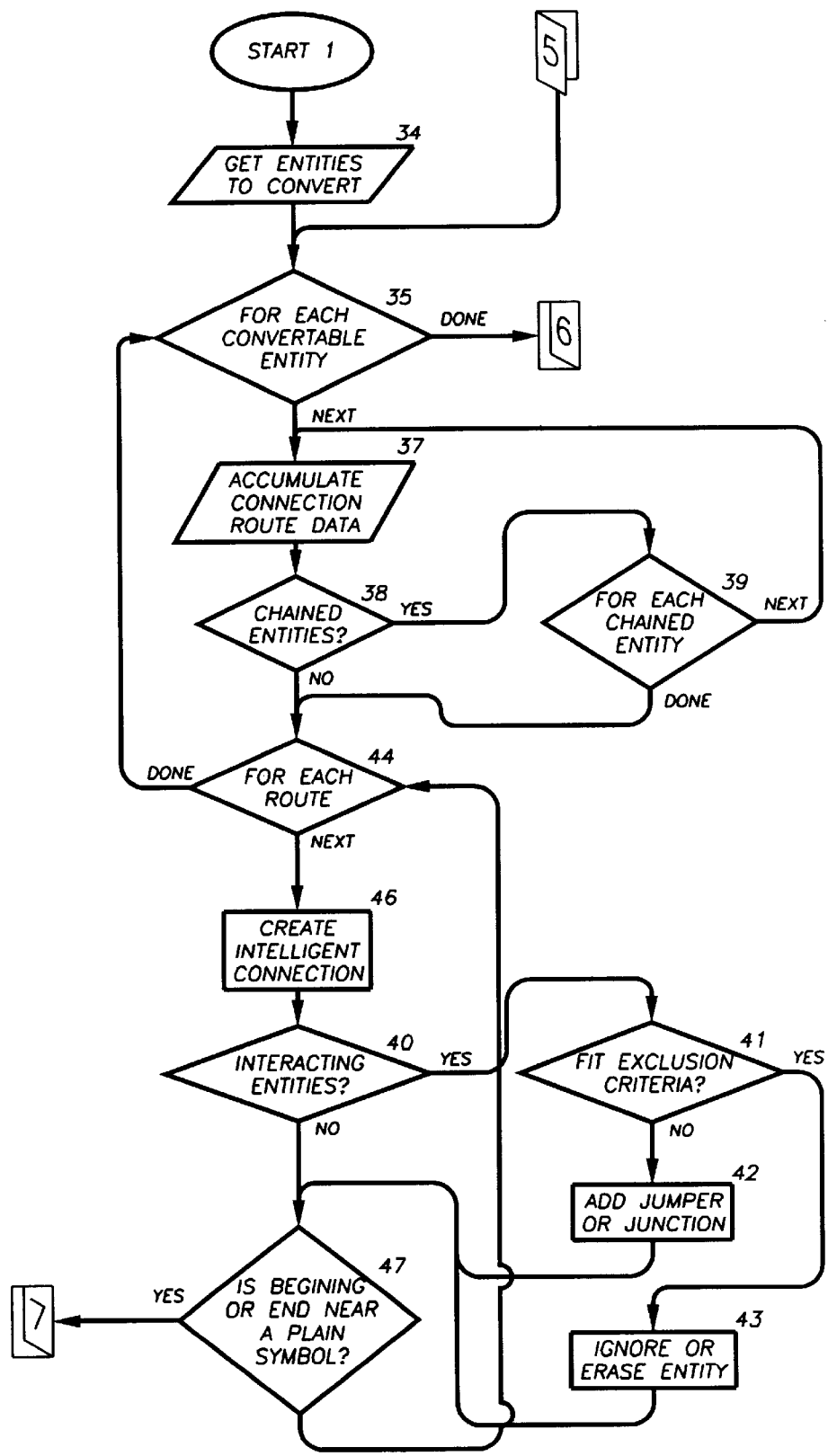
FIG. 5 is a flow chart showing the preferred method for converting dumb connections into intelligent connections.
Figure 7B:
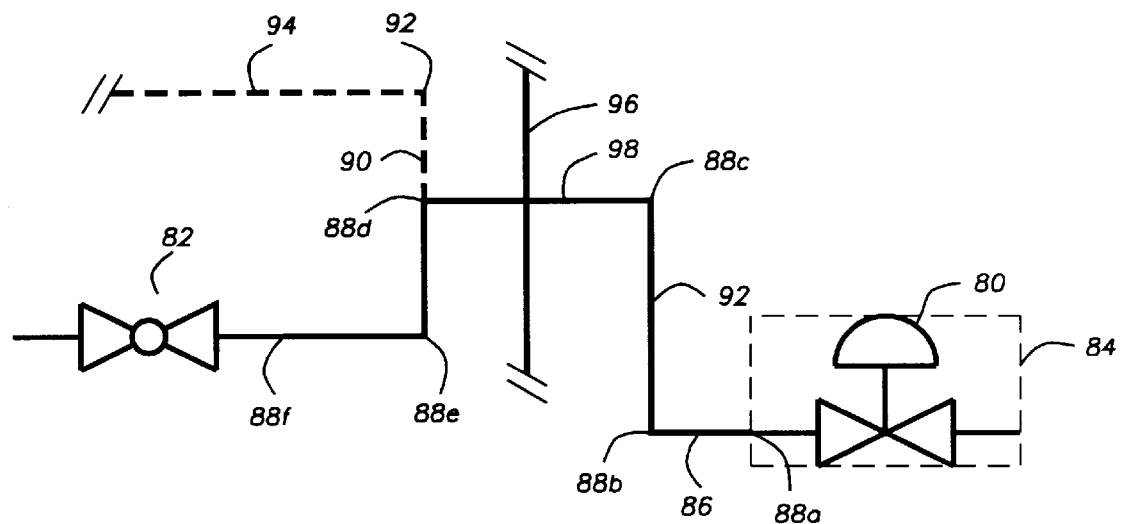

Referring now to FIG. 5, for each entity (see step 35) the data defining a connection route is determined and accumulated at step 37, thus building an intelligent definition of the connector along that route. In FIG. 7b, line 86 was found at pointer 80 using area 84. The coordinates of points 88a and 88b are added to the new connection route data. At step 38 all entities are found which are chained or have elements in common with the new route. Line 92 is such an entity and is found because it shares end points with line 86. For each chained entity (see step 39) the coordinate data further defining the new route is accumulated at step 37 until all the coordinates of all entities along each possible route beginning with the starting entity 86 are found. The coordinates of points 88c, d, e and f are thus added to the new connection route data, as are the coordinates of points 92 and points beyond line 94, which show a branching route which begins at line 90.

For each route (see step 44) an intelligent connection is created at step 46. Intelligent connection 104 in FIG. 7a was created by finding coordinates, starting with a first end 88a, ending at second end 88f and including intermediate points 88b, c, d and e. At step 40 interacting entities are determined which lie along the route. For the route defined by points 88a, b, c, d, e and f, line 96 is found intersecting line 98, and line 90 is found merging at point 88d. At step 41, if the interacting entity can define a connection, a jumper or junction is added to intelligent connection 104 at step 42. If the interacting entity defines an intersection point a jumper 100 is added and if it defines a merge point a junction 102 added. At step 43, entities which cannot define connections, are ignored, erased, or avoided by connection 104.

At step 47, the ends of connection 104 can be checked for the presence of symbols which have not been converted to intelligent symbols, such as symbol 82 In FIG. 7a. Such symbols can be converted to intelligent symbols using the method shown in FIG. 1.

The method shown in FIG. 5 may also be applied to connection entities selected directly as shown at step 34 such as by operator input, rather than during symbol conversion.

Figure 2:
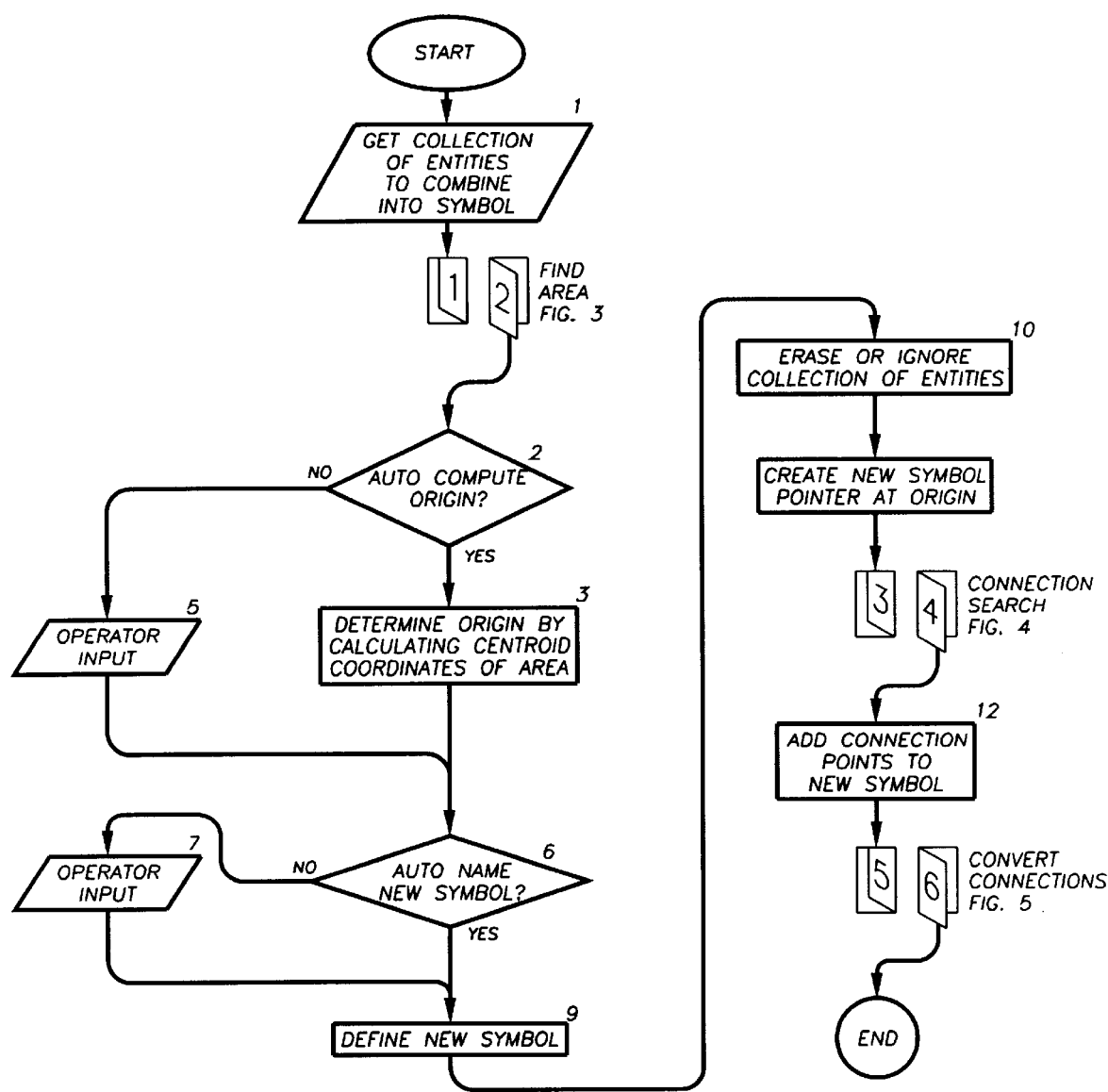
FIG. 2 is a flow chart showing the preferred method for automatically creating an intelligent symbol from a collection of entities.
Figure 8B:
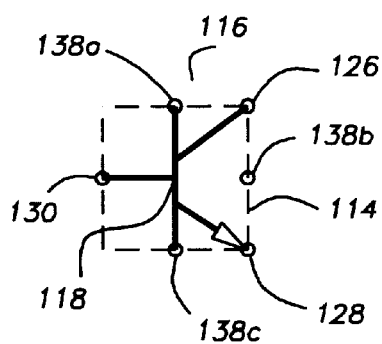

FIG. 2 is flow chart showing a method for automatically converting a group of computer-generated graphical entities into an intelligent symbol. At step 1 an entity or group of entities is determined by operator selection and/or algorithmically by entity distribution on the diagram. In FIG. 8a the group of entities inside imaginary boundary 106 are individual entities that are to be converted to an intelligent symbol. Connection lines 108, 110, and 112 are not a part of the group. An area substantially including the group of entities 106 is determined using the method shown in FIG. 3. FIG. 8b 114 shows the total area of the entities 106 for the new intelligent symbol 116. At step 2 a geometrical origin of the new intelligent symbol is determined either at step 5 by operator input, or algorithmically at step 3. If determined by algorithm, the origin is preferably a centroidal location for the origin 118 which is calculated for the area 114. The origin can be also be determined using other methods known in the art. At step 6 a name for the new intelligent symbol is either generated automatically or by input from the operator at step 7. A new intelligent symbol is now defined at step 9 using the defined group of entities 106, origin 118 and the intelligent symbol name determined at step 6 or step 7. The symbol can also be defined at any later step in the procedure, and the sequence of steps can likewise be rearranged without altering the scope or intent of the invention.

At step 10 the group of entities 106 is erased or ignored. The entities are erased if the conversion procedure is being performed on a diagram open for editing by the operator, and ignored if being converted before the diagram is displayed to the operator. A pointer 120 (see FIG. 8c) is created at pointer origin 122 which references the new intelligent symbol 116. The pointer 120 now preferably appears exactly like the original group of entities 106, though graphical or other indications that the entities are now an intelligent symbol can be displayed to the operator.

The connection points for intelligent symbol 116 are determined as illustrated in FIG. 4. Connection points 126, 128 and 130 were found at the end points of lines 132, 134, and 136 where they met pointer area 124 of pointer 120. At step 12 connection points 126, 128 and 130 are added to intelligent symbol 116 along with any default connection points 138a, b and c.

Figure 10C:
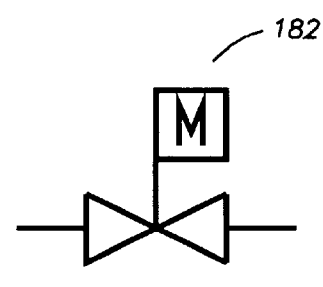
Figure 10B:
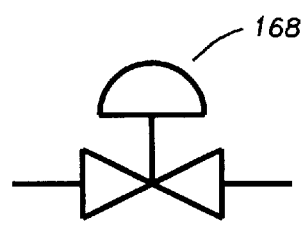

FIG. 9a illustrates a preferred procedure for automatically creating a multi-symbol from two or more symbols. At step 140 the symbols to be combined "members" 180 (see FIG. 10a) are selected by operator input or other method. In FIG. 10a symbols 160, 162, 164 and 166 are selected to be combined into one multi symbol. Each of those symbols has a symbol definition. It is not necessary that the symbols be intelligent symbols. At step 142 the default symbol 160 is selected. This is how the multi-symbol will appear in its default or initial state. Alternate symbols 170 will be initially invisible. At step 144 a definition for new multi-symbol 168 (see FIG. 10b) is formed. That definition contains the entities of default symbol (first symbol) 160 and a pointer to the default symbol. Multi symbol 168 can also be defined with only a pointer to default symbol 160 rather than entities and a pointer. For each alternate symbol (second symbol) 170 (see step 146) a pointer referencing the symbol is added to the multi-symbol 168 at step 148. For each selected symbol 180 (see step 147) the pointer is either erased or replaced with a pointer to the multi symbol 168. If replace is chosen at step 141, the pointer is replaced using the method beginning with step 153 (see FIG. 9b), otherwise the pointer is erased at step 150. At step 153, if the symbol is the default symbol 160, the pointer is replaced with a pointer to the multi-symbol 168, since the multi-symbol appears like symbol 160 in its default state. The multi-symbol pointer 168 now preferably appears exactly like the default symbol pointer 160, though graphical or other indications that the entities are now a multi-symbol can be displayed to the operator. If the symbol is not the default, a temporary symbol 182 (see FIG. 10c) is defined at step 143 which is made up of the entities of the alternate symbol (second symbol) 162 and a pointer to the multi-symbol 168. The symbol pointer is then replaced with a pointer to the temporary symbol 182.

The definitions of each of the member symbols are preserved and the multi-symbol definition is linked to that of the member symbols such that if changes are made to the member symbols, those changes will be reflected in the multi-symbol. The entities of each member symbol 180 can also be substituted in place of a pointer and referred to as a group of entities. The symbol origins (174, 176 and 178) of each alternate symbol 170 are preferably made to coincide with the symbol origin 172 of default symbol 160, but the symbols can be aligned by other means such as aligning areas.

To change the appearance of a multi-symbol, at step 149 (see FIG. 9c) the definition of the multi-symbol is read to obtain the member symbols. At step 151 the member to display is chosen, and that member is displayed using the method beginning with step 153.

I claim:

1. A method of enhancing a computer-generated symbol comprising one or more graphical entities, the method comprising the steps of:
    identifying one or more connection points, the one or more connection points having variable positions, and the one or more connection points being associated with at least one of the one or more graphical entities forming the computer-generated symbol;
    generating coordinates for the one or more connection points, the coordinates describing the one or more connection points in relation to a reference point;
    building a symbol definition for the computer-generated symbol, the symbol definition comprising the coordinates for the one or more connection points;
    and wherein the step of identifying the one or more connection points comprises the step of:
        determining a perimeter substantially including the computer-generated symbol;
        identifying such of the one or more graphical entities that are on or near the perimeter;
        determining if the identified graphical entities that are on or near the perimeter define the one or more connection points;
    and wherein the step of generating coordinates for the one or more connection points comprises the step of generating coordinates for the identified graphical entities if the identified graphical entities define the one or more connection points to the computer-generated symbol.

2. A method of enhancing one or more computer-generated graphical entities, wherein each of the one or more computer-generated graphical entities has a definition, the method comprising the steps of:
    combining the one or more computer-generated graphical entities such that the computer-generated graphical entities form a symbol;
    determining a geometrical origin for the symbol;
    identifying such of the computer-generated graphical entities that form connection points on the symbol, the connection points being locations at which the symbol can be connected to another computer-generated graphical entity;
    generating coordinates for the connection points such that the coordinates describe the connection points in relation to a reference point;
    building an intelligent definition for the symbol comprising the definitions of the computer-generated graphical entities, the geometrical origin for the symbol and the coordinates for the connection points.

3. The method of claim 2 wherein the step of determining a geometrical origin for the symbol comprises the steps of determining an area substantially including the symbol and determining a centroidal location of the area.

4. For use in a computer aided design system, a method of creating a multi-symbol from a first symbol having a first symbol definition and a second symbol having a second symbol definition, the method comprising the steps of:
    forming a multi-symbol definition by combining the first symbol definition with the second symbol definition;
    preserving the second symbol definition, and linking the multi-symbol definition and the second symbol definition such that if changes are made to the second symbol definition, such changes are reflected in the multi-symbol;
    wherein the multi-symbol definition comprises a pointer to the second symbol definition.

5. For use in a computer aided design system, a method of creating a multi-symbol from a first symbol having a first symbol definition and a second symbol having a second symbol definition, the method comprising the steps of:
    forming a multi-symbol definition by combining the first symbol definition with the second symbol definition;
    preserving the second symbol definition, and linking the multi-symbol definition and the second symbol definition such that if changes are made to the second symbol definition, such changes are reflected in the multi-symbol;
    wherein the multi-symbol definition comprises a pointer to the first symbol definition.

6. For use in a computer aided design system, a method of creating a multi-symbol from a first symbol having a first symbol definition and a second symbol having a second symbol definition, the method comprising the steps of:
    forming a multi-symbol definition by combining the first symbol definition with the second symbol definition;
    preserving the second symbol definition, and linking the multi-symbol definition and the second symbol definition such that if changes are made to the second symbol definition, such changes are reflected in the multi-symbol;
    identifying the entities in the first symbol which coincide with entities in the second symbol;
    eliminating the identified entities.

7. A method of enhancing a computer-generated symbol comprising one or more graphical entities, the method comprising the steps of:
    identifying the graphical entities which could define one or more points for connecting to another computer-generated symbol;
    determining coordinates for the identified graphical entities, the coordinates describing the points for connecting to another computer-generated symbol in relation to a reference point;
    building a symbol definition comprising the determined coordinates;
    locating a connector for connecting the one or more graphical entities to another computer-generated symbol and wherein the method of enhancing is commenced by manipulating the connector
    wherein the computer-generated symbol is referenced by a pointer and wherein the step of building a symbol definition comprises enhancing the pointer with the determined coordinates.

8. A method of enhancing a computer-generated symbol comprising one or more graphical entities, the method comprising the steps of:
    identifying the graphical entities which could define one or more points for connecting to another computer-generated symbol;

determining coordinates for the identified graphical entities, the coordinates describing the points for connecting to another computer-generated symbol in relation to a reference point;

building a symbol definition comprising the determined coordinates;

locating a connector for connecting the one or more graphical entities to another computer-generated symbol and wherein the method of enhancing is commenced by manipulating the connector and wherein moving the connector causes the symbol definition to change automatically.

9. A method of enhancing a computer-generated symbol comprising one or more graphical entities, the method comprising the steps of:

identifying the graphical entities which could define one or more points for connecting to another computer-generated symbol;

determining coordinates for the identified graphical entities, the coordinates describing the points for connecting to another computer-generated symbol in relation to a reference point;

building a symbol definition comprising the determined coordinates;

locating a connector for connecting the one or more graphical entities to another computer-generated symbol and wherein the method of enhancing is commenced by editing the computer-generated symbol.

10. A method of enhancing a computer-generated symbol, the computer-generated symbol comprising at least one graphical entity, the method comprising the steps of:

locating a connector in proximity to the computer-generated symbol, the connector comprising a point for connecting the connector to the computer-generated symbol;

determining coordinates for the located connector;

building a symbol definition comprising the determined coordinates;

wherein the computer-generated symbol is referenced by a pointer and wherein the step of building a symbol definition comprises enhancing the pointer with the determined coordinates.

11. A method of enhancing a computer-generated symbol, the computer-generated symbol comprising at least one graphical entity, the method comprising the steps of:

locating a connector in proximity to the computer-generated symbol, the connector comprising a point for connecting the connector to the computer-generated symbol;

determining coordinates for the located connector;

building a symbol definition comprising the determined coordinates;

wherein moving the connector causes the symbol definition to change automatically.

12. A method of enhancing a computer-generated symbol, the computer-generated symbol comprising at least one graphical entity the method comprising the steps of:

locating a connector in proximity to the computer-generated symbol, the connector comprising a point for connecting the connector to the computer-generated symbol;

determining coordinates for the located connector;

building a symbol definition comprising the determined coordinates;

wherein the method of enhancing is commenced by editing the computer-generated symbol.

13. The method of claim 12 further comprising the step of determining whether the computer-generated symbol has been transformed and if it has been so transformed, then performing the reverse of the transformation on the determined coordinates.

* * * * *